(12) United States Patent
Stewart et al.

(10) Patent No.: US 8,407,523 B2
(45) Date of Patent: Mar. 26, 2013

(54) METHOD FOR PROTECTING SOFTWARE PROGRAMS

(75) Inventors: Neil Stewart, Glasgow (GB); Graeme Harkness, Glasgow (GB)

(73) Assignee: ITI Scotland Limited, Glasgow (GB)

( * ) Notice: Subject to any disclaimer, the term of this patent is extended or adjusted under 35 U.S.C. 154(b) by 802 days.

(21) Appl. No.: 12/477,051

(22) Filed: Jun. 2, 2009

(65) Prior Publication Data
US 2009/0307536 A1 Dec. 10, 2009

Related U.S. Application Data

(60) Provisional application No. 61/059,437, filed on Jun. 6, 2008.

(51) Int. Cl.
*G06F 21/00* (2006.01)
(52) U.S. Cl. .......................... 714/35; 713/190
(58) Field of Classification Search .................. 714/49, 714/35; 713/190
See application file for complete search history.

(56) References Cited

U.S. PATENT DOCUMENTS

| 6,073,239 | A | * | 6/2000 | Dotan | .............................. | 726/24 |
| 2003/0093685 | A1 | | 5/2003 | Tobin | | |
| 2003/0217355 | A1 | * | 11/2003 | Hack et al. | ..................... | 717/129 |
| 2005/0183072 | A1 | * | 8/2005 | Horning et al. | ............... | 717/140 |
| 2009/0094601 | A1 | * | 4/2009 | Vstovskiy et al. | ............ | 717/177 |

OTHER PUBLICATIONS

Gagnon et al.; "Software Protection through Anti-Debugging"; IEEE Security and Privacy; IEEE Computer Society; New York, NY, US; vol. 5, No. 3; May 1, 2007; pp. 82-84; XP011182667.
Collberg et al.; "A Taxonomy of Obfuscating Transformations"; Technical Report Department of Computer Science University of Auckland; No. 148; Jul. 1, 1997; pp. 1-36; XP002140038.
Lawson; "Anti-debugging: using up a resource versus checking it"; Root Labs Rdist; May 21, 2008; XP002493748.
Erickson; "Hacking: The Art of Exploitation"; Oct. 2004; XP002493749.
Search Report from EPO on co-pending EP application (EP 08251985.1) dated Sep. 15, 2008.

* cited by examiner

*Primary Examiner* — Michael Simitoski
*Assistant Examiner* — Ali Shayanfar
(74) *Attorney, Agent, or Firm* — Klein, O'Neill & Singh, LLP

(57) ABSTRACT

In order to protect a software program, at least one corruption function is included in the program. Also included in the program is at least one instruction that causes the program to be directed to the corruption function. An available breakpoint is then set such that, when the starting location of the corruption function is reached, an exception is generated and the handling of the exception causes the corruption function not to run. This has the effect that, if a malicious user attempts to use the available hardware breakpoint to perform unauthorized actions on the software program, the corruption function will run, and the software program will be unusable.

12 Claims, 2 Drawing Sheets

METHOD FOR PROTECTING SOFTWARE PROGRAMS

CROSS-REFERENCE TO RELATED APPLICATION

This application claims the benefit, under 35 U.S.C. §119(e), of co-pending U.S. Provisional Application No. 61/059,437; filed Jun. 6, 2008, the disclosure of which is incorporated herein in its entirety.

FEDERALLY SPONSORED RESEARCH OR DEVELOPMENT

Not Applicable.

BACKGROUND

This disclosure relates to a method for protecting software programs, and in particular to a method that protects software programs against attacks that use hardware breakpoints, or similar mechanisms, to compromise a program.

In releasing a software application for execution on end users' hardware, a program developer is effectively providing a user with complete access to the program code of that application. Unfortunately, it is a fact that some end-users will attempt to compromise a software application in order, for example, to obtain illegal copies, gain unlicensed access to certain features, steal intellectual property from the application, inject malicious code, or cheat in online games. Indeed, in the context of online gaming, which often seeks to support hundreds or thousands of players simultaneously over a network, the occurrence of online cheating can seriously undermine honest players' experience of the game. Free access to executable code by unauthorized users can often result in loss of intellectual property, and may provide the user with an easy means for probing the application for security vulnerabilities. Also, applications may be reverse-engineered and then modified to remove metering or usage control before being recompiled, ultimately resulting in a loss of revenue for the code provider.

Thus, the environment into which publishers release their programs can be considered to be a hostile one. There is therefore a need to protect programs from tampering or misuse, which may involve unauthorized modification and/or copying.

It has been recognized that hardware breakpoints may be used to perform unauthorized actions on a program. Typically, a hardware breakpoint is set by storing a memory address in a register (sometimes referred to as a "debug register"). When a running application accesses the memory at the stored memory address, the application is interrupted, and an exception is generated. The execution of the application code is halted, and a piece of user code is run. This mechanism is provided to allow for debugging of software. Thus, a legitimate user such as a software developer can set the hardware breakpoints such that debug operations can be performed when the application accesses the memory at one of the stored memory addresses. It should be noted that this mechanism, or something very similar, exists in many different processors and systems, although the terminology that is used to describe it may differ from one processor to another.

Although hardware breakpoints are provided to allow a legitimate user to perform a necessary function, it has also been suggested that hardware breakpoints may be set by a malicious user in such a way that illegitimate operations are performed when the application accesses the memory at one of the stored memory addresses.

SUMMARY

Preferred embodiments of the method disclosed herein seek to protect software against the types of attacks discussed above. Thus, according to a first aspect of the present disclosure, there is provided a method of protecting a software program, the method comprising:
 a. including in the program at least one corruption function having a starting location;
 b. including in the program at least one instruction that causes the program to be directed to the corruption function; and
 c. setting an available breakpoint such that, when the starting location is reached, an exception is generated and the handling of the exception causes the corruption function not to run.

According to a second aspect of the present disclosure, there is provided a computer program product, comprising:
 a. at least one corruption function having a starting location:
 b. at least one instruction that causes the program to be directed to the corruption function; and
 c. code for setting an available breakpoint such that, when the starting location is reached, an exception is generated and the handling of the exception causes the corruption function not to run.

BRIEF DESCRIPTION OF THE DRAWINGS

For a better understanding of the present disclosure, reference will now be made, by way of example, to the accompanying drawings, in which.

DETAILED DESCRIPTION

Figure 1:
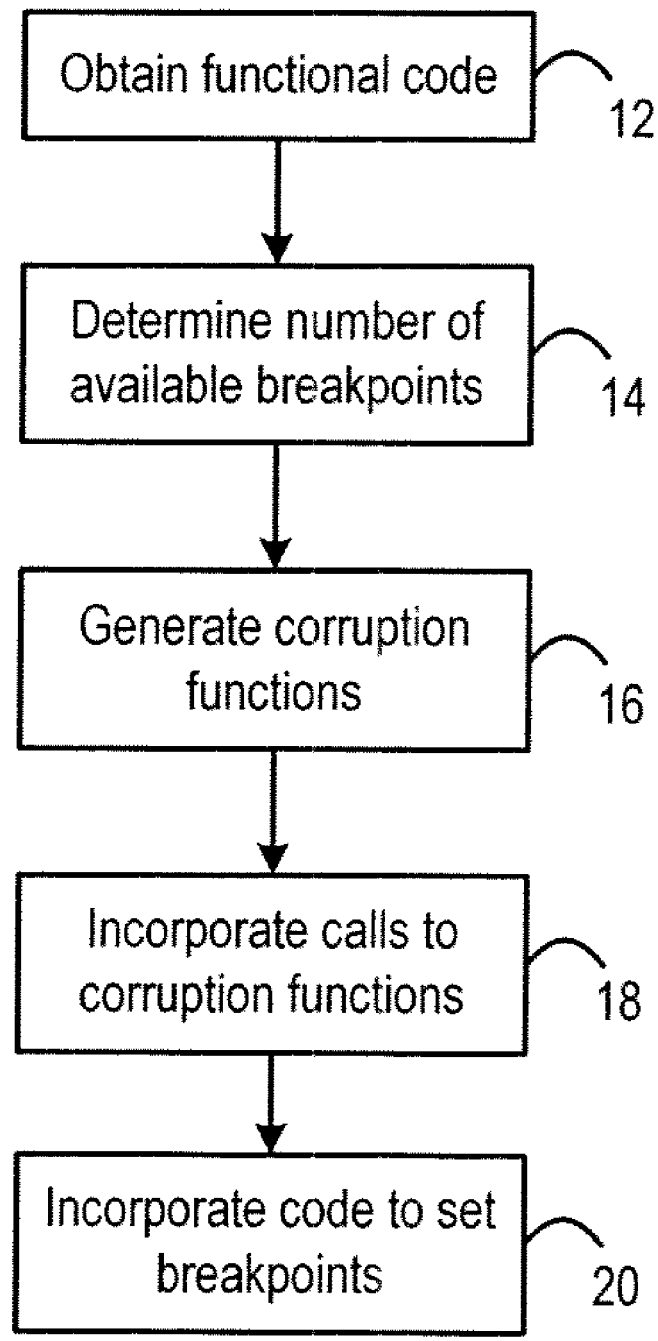
FIG. 1 is a flow chart, illustrating a method in accordance with the present disclosure.

FIG. 1 is a flow chart, illustrating a method in accordance with the present disclosure. In step 12, a functional software program is obtained. The program may be any existing program, to which it is desired to add a level of protection, in order to prevent at least one possible attack on the program. The description here assumes that the functional software program is written first, and that the method of FIG. 1 is applied to it subsequently. Since the method of FIG. 1 makes use of the debug registers that can be used by the software developer to debug the program, it may be most convenient for the method to be applied after the program has been written and debugged. However, it is equally possible that the steps required to protect the program could be incorporated while the program is being written. In addition, although it is assumed here that the method of FIG. 1 is applied to the program after it has been compiled into executable code, it could also be performed on the application source code, or on any intermediate abstract representation of the code, for example an abstract syntax tree or a single static assignment form. Moreover, the steps can be performed either manually, or automatically by a suitable further program.

Figure 2:
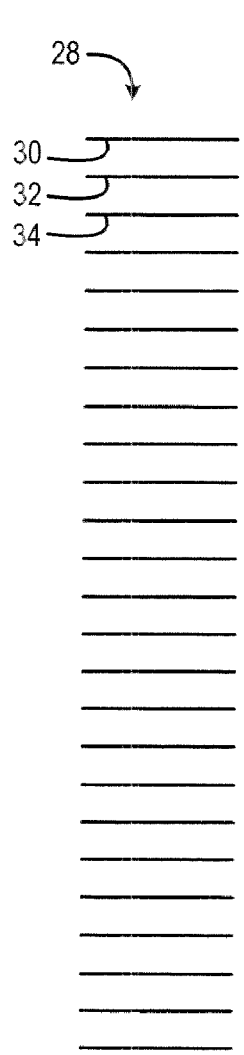
FIG. 2 illustrates a state of a software program, before application of the method of FIG. 1.

FIG. 2 is a schematic representation of the functional software program 28, containing multiple instructions 30, 32, 34, etc. The reader will appreciate that, in any realistic example, the program 28 will contain many thousands of separate instructions. In step 14, a determination is made regarding the hardware platform on which the software is to run. The method of FIG. 1 protects the software program specifically against an attack that is based on the use of hardware breakpoints, although related methods can be used to protect the program against similar attacks using other available mechanisms. However, where, as here, the method is being used to protect the software program against an attack that is based on the use of hardware breakpoints, it is preferable to have some information about the hardware on which the software is intended to be run by the eventual end users, and hence to have some information about the hardware breakpoints that will be available.

For example, where the software is to be run on a typical personal computer, it will be recognized that most PCs contain processors in which four hardware breakpoints may be set. In other situations, it may be necessary to have more detailed information about the class of processor, or the specific processor, on which the software will be run, in order to be able to take full account of the available hardware breakpoints. Specifically, the method of FIG. 1 requires that the number of available hardware breakpoints be taken into consideration, and requires knowledge of the mechanism for setting the hardware breakpoints.

In step 16 of the method shown in FIG. 1, one or more corruption functions is/are generated, and incorporated in the program 28 of FIG. 2. In the presently preferred embodiment described herein, there is one corruption function associated with each of the available hardware breakpoints. That is, four hardware breakpoints may be set, and so four corruption functions are generated, although a smaller number of corruption functions will still provide some protection against some attacks that may be applied against the program.

Figure 3:
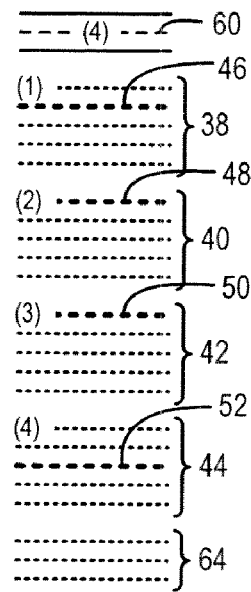
FIG. 3 illustrates a state of a software program, after application of the method of FIG. 1.

FIG. 3 shows the software program 36 after it has been modified in accordance with the method of FIG. 1. Thus, the modified program 36 still contains the instructions 30, 32, 34 of the unmodified program 28, as well as four corruption functions 38, 40, 42, 44.

The corruption functions 38, 40, 42, 44 are blocks of code that, if they are run, adversely affect the running of the application. Preferably, the corruption functions cause serious and irreparable damage to the execution of the application. For example, an application may be made unable to save files, or may crash after a limited period of user activity. Further, the corruption function should preferably be such that its operation cannot be overridden by the user of the software (who may be the person trying to perform the unauthorized operation on the software), or by the program itself. As an example, the corruption function might make random modifications to data stored on the process stack, for example by writing random values to particular locations, or writing zeroes to random locations. However, it will be appreciated that there are a very large number of possible functions that could be used in this way as corruption functions.

Each of the corruption functions 38, 40, 42, 44 has a respective starting instruction 46, 48, 50, 52, which is at or before the start of the code that causes the corruption. There may be one or more instruction before the starting instruction, provided that this does not have any detrimental effect on the program.

In step 18, a large number of instructions are inserted into the functional code; these inserted instructions represent calls to the corruption functions. As shown in FIG. 3, there are instructions 54 that call the first instruction of the first corruption function 38, instructions 56 that call the first instruction of the second corruption function 40, instructions 58 that call the first instruction of the third corruption function 42, and instructions 60 that call the first instruction of the fourth corruption function 44.

These instructions are inserted at locations within the functional code that mean that one or more of the instructions will inevitably be reached whenever the program is run. In the case of an average-complexity program of a few megabytes, there may be of the order of 10,000 of these instructions.

At step 20, additional code 62 is added to the program. This additional code causes the hardware breakpoints to be set to desired values when the program is first run. In addition, an exception handler 64 is included, as described in more detail below.

Figure 4:
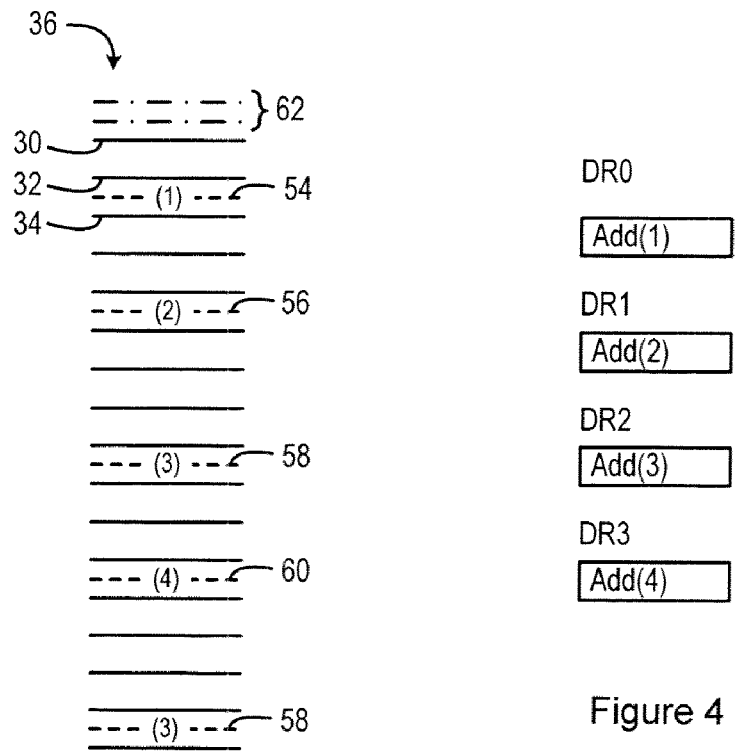
FIG. 4 illustrates a state of debug registers in a processor running the software program of FIG. 3.

Specifically, as shown in FIG. 4, where the hardware breakpoints are set in debug registers DR0, DR1, DR2, DR3, the first debug register DR0 contains the starting address 46 of the first corruption function 38, the second debug register DR1 contains the starting address 48 of the second corruption function 40, the third debug register DR2 contains the starting address 50 of the third corruption function 42, and the fourth debug register DR3 contains the starting address 52 of the fourth corruption function 44.

Thus, whenever the program is run, one of the instructions 54, 56, 58, 60 is reached at regular intervals. This causes the system to call one of the corruption functions 38, 40, 42, 44. However, while the hardware breakpoints are set at the starting addresses of the corruption functions, this always causes an exception to be generated.

When an exception is generated, the program passes to the exception handler 64. This is user code that therefore runs when a hardware breakpoint is triggered. The code is written such that it generates a return instruction so that the normal running of the program is resumed, without executing the corruption function. If instead the malicious user sets any other value in one of the debug registers, in order to use the hardware breakpoint for malicious purposes, the corruption function is called, and the program stops operating.

It should be noted that some processors allow hardware breakpoints to be set in such a way that they operate not on single memory addresses, but on blocks of memory. In such cases, care must be taken to ensure that the starting addresses of the corruption functions are placed appropriately, so that they cannot be encompassed by a single hardware breakpoint.

As described above, each of the instructions 54, 56, 58, 60 calls the relevant one of the corruption functions, whenever it is reached. However, in order to cause the program to operate in a more non-deterministic way, and thereby make it more difficult for an unauthorized user to perform illegitimate operations on the software, it is possible to introduce a mechanism that means that the instructions 54, 56, 58, 60 do not always call the relevant one of the corruption functions. For example, the instructions 54, 56, 58, 60 may be such that, when they are reached, a timestamp counter of the processor is examined (i.e. an RDTSC instruction in the case of an Intel® x86 processor). Then, the relevant one of the corruption functions may be called only when the lower bits of the timestamp counter value take a certain value or fall within a certain range.

Thus, because the lower bits of the timestamp counter value change so frequently, it is effectively impossible in advance to predict whether the instructions 54, 56, 58, 60 will in fact call the relevant corruption function. That is, the instructions 54, 56, 58, 60 will only call the relevant corruption function when a non-deterministic condition is met. Although the values of the lower bits of the timestamp counter value are used as the non-deterministic condition in this example, it will be apparent that other non-deterministic conditions could be used.

The method described herein works most successfully when used in conjunction with an anti-tamper mechanism, of the type that can detect and prevent any modification of the code.

There is thus described a method, and a computer program or algorithm implementing the method, for providing a degree of protection for a program against an attack based on hardware breakpoints.

The invention claimed is:

1. A method of protecting a software program for execution on hardware, wherein the software program is intended for use on hardware having a known number of available instruction breakpoints, the method comprising:
 including in the program at least one corruption function having a starting location;
 including in the program at least one instruction that upon execution on hardware, causes the program to be directed to the corruption function;
 including in the program additional code that, upon execution on hardware, causes the program to set an available hardware breakpoint such that, when the program has been directed to the corruption function and the starting location is reached during execution on hardware, an exception is generated and the handling of the exception generates a return instruction so that the normal running of the program is resumed, causing the corruption function not to run;
 wherein:
 the at least one corruption function comprises a plurality of corruption functions, each having a respective starting location, one corruption function being included for each of said available instruction breakpoints, each of the corruption functions comprising blocks of code which, if executed, adversely affect execution of the program;
 the at least one instruction that causes the program to be directed to the corruption function comprises a plurality of instructions, with for each of the corruption functions there being at least one instruction that causes the program to be directed to that corruption function; and
 wherein the additional code that causes the program to set the available hardware breakpoint includes code to set each available instruction breakpoint such that, when the program has been directed to one of the corruption functions and the respective one of said starting locations is reached, a respective exception is generated, and the handling of each exception generates a return instruction so that the normal running of the program is resumed, so that the respective corruption function does not run.

2. A method as claimed in either of claims 1, wherein the corruption function causes
 random data to be written to a processor stack.

3. A method as claimed in either of claims 1, wherein the corruption function causes data to be written to random locations in a processor stack.

4. A method as claimed in claim 1, wherein the at least one instruction causes the program to be directed to the corruption function only when a non-deterministic condition is met.

5. A method as claimed in claim 4, wherein the non-deterministic condition relates to lower bits of a timestamp counter value.

6. A method as claimed in claim 1, wherein the starting instructions of the corruption
 functions are placed so that they cannot be encompassed by a single breakpoint.

7. A computer program product including program code stored in a non-transitory computer readable memory and executable on hardware,
 comprising:
 at least one corruption function having a starting location in computer memory;
 at least one instruction that causes the program to be directed to the corruption function; and
 code for setting an available hardware breakpoint such that, when the program has been directed to the corruption function and the starting location in computer memory is reached, an exception is generated and the handling of the exception generates a return instruction so that the normal running of the program is resumed, causing the corruption function not to run;
 wherein the computer program product is configured for use on hardware having a known number of available instruction breakpoints, and wherein,
 the at least one corruption function comprises a plurality of corruption functions, each having a respective starting instruction, one corruption function being included for each of said available instruction breakpoints, each of the corruption functions comprising blocks of code which, if executed, adversely affect execution of the program;
 the at least one instruction comprises a plurality of instructions, with, for each corruption function, at least one instruction that causes the program to be directed to that corruption function; and
 the code for setting each available instruction breakpoint sets each available instruction breakpoint such that, when the program has been directed to one of the corruption functions and the respective one of said starting instructions is reached, a respective exception is generated, and the handling of each exception generates a return instruction so that normal running of the program is resumed, so that the respective corruption function does not run.

8. A computer program product as claimed in claim 7, wherein the corruption function causes random data to be written to a processor stack.

9. A computer program product as claimed in claim 7, wherein the corruption function causes data to be written to random locations in a processor stack.

10. A computer program product as claimed in claim 7, wherein the at least one instruction causes the program to be directed to the corruption function only when a non-deterministic condition is met.

11. A computer program product as claimed in claim 10, wherein the non-deterministic condition relates to lower bits of a timestamp counter value.

12. A computer program product as claimed in claim 7, wherein the starting instructions of the corruption functions are placed so that they cannot be encompassed by a single breakpoint.

* * * * *